Figure 1:
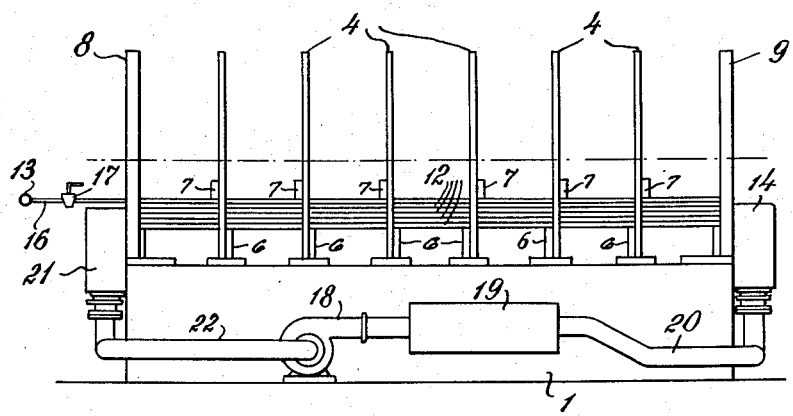

Nov. 29, 1949  W. HUBER  2,489,888
TUBE NEST MANUFACTURE

Filed July 3, 1945  3 Sheets-Sheet 1

INVENTOR
WALTER HUBER
BY
ATTORNEYS

Nov. 29, 1949 W. HUBER 2,489,888
TUBE NEST MANUFACTURE
Filed July 3, 1945 3 Sheets-Sheet 2
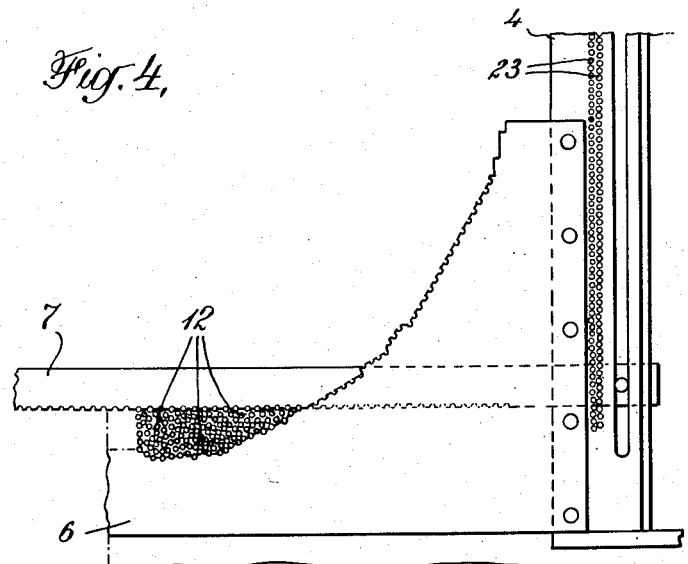
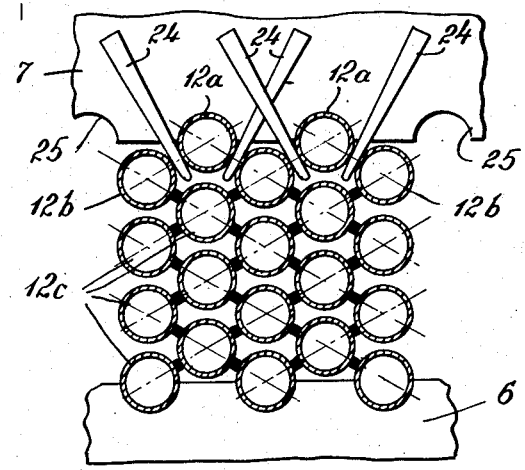
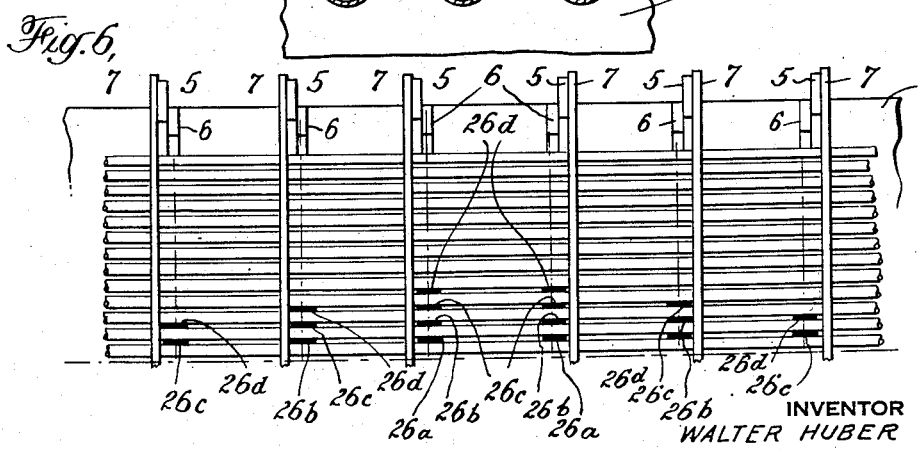
INVENTOR
WALTER HUBER
BY
ATTORNEYS Nov. 29, 1949  W. HUBER  2,489,888
TUBE NEST MANUFACTURE
Filed July 3, 1945  3 Sheets-Sheet 3

INVENTOR
WALTER HUBER
BY
ATTORNEYS

Patented Nov. 29, 1949

2,489,888

UNITED STATES PATENT OFFICE 2,489,888

TUBE NEST MANUFACTURE

Walter Huber, Winterthur, Switzerland, assignor to Sulzer Freres, Societe Anonyme, Winterthur, Switzerland Application July 3, 1945, Serial No. 603,014
In Switzerland September 23, 1944

10 Claims. (Cl. 113—112)

The invention relates to a method of constructing a nest of parallel tubes which are supported on each other by welded bridges and are attached at both ends to tube end walls. The method consists in that the tube end walls and the tubes are held by a template scaffolding during the insertion of the bridges, some or all of the tubes which are heated by welding being cooled by means of a cooling medium while some or all of the tubes a cooling medium while some or all of the tubes only slightly or not at all warmed by welding are heated by means of a heating medium. In this way the effect can be obtained that during the manufacture of a nest any warping of the nest due to non-uniform heating and the stresses arising therefrom can be completely avoided.

For carrying out the method a scaffolding can be provided on which templates are attached which hold the tubes at least over part of the circumference of the nest and the tube end walls in the position corresponding to the design of the nest.

Both the cooling medium and the heating medium are preferably conducted through the tubes of the nest. During welding itself it is advisable to interrupt the flow of cooling medium through the tube on which welding is being done. Between the cooled and the heated tubes the tubes of at least one layer may contain a medium which neither absorbs nor gives off heat, or an insulating substance may be pressed into them. The manufacture of the tube nest may be facilitated by setting the tubes between which bridges are to be made at the right distance from each other by means of wedges before the bridges are made.

If three or more welded bridges are provided for a single tube, it is advisable to arrange the bridges of one tube layer in staggered fashion in such a way that not all of them are applied to one tube at the same time, further bridges being simultaneously applied to neighbouring tubes of the same layer. The tubes of two neighbouring layers may be inspected for leakages by means of a pressure medium before a further layer is supported on one of the first two layers. When the bridges have been made, the tubes may be fixed, for instance by inserting them into the tube end walls. When this is done the tubes may be expanded in the region of the bores in the tube end walls by means of a pressure medium introduced into the interior of the tubes.

In the device for applying the invention templates may be attached which have the form of at least a part of the circumference of the nest and are held by the scaffolding. It is also possible for template beams to be provided which have openings to fit the tubes of a whole layer. The template scaffolding preferably has, to the sides of the tube nests, pillars to which the template beams and templates can be attached. These lateral pillars may have apertures which allow the template beams to be fixed as desired at different heights, the apertures corresponding to the positions of the single tube layers. Distributing and collecting casings for supplying and leading off the heating medium may also be movably laid on the tube end walls on both sides. A movable distributing pipe may also be provided for supplying the cooling medium, and from this supply pipes may lead to the single tubes of at least one layer of the nest. It is expedient for these supply pipes to be provided with closing members through which the supply of cooling medium to the tubes of the nest can be interrupted, for instance during the insertion of the welding bridges. A movable distributing pipe may also be provided for the pressure medium used for detecting leakages, and from this pipe supply pipes lead to the single tubes of at least one layer of the nest. The supply pipes may have, at the end introduced into the tubes of the nest, sealing means which are pressed against the tube surface by the pressure of the pressure medium supply itself. At the ends of the tubes opposite to the ends connected to the distributing pipe for pressure medium, stoppers may be provided which seal the tubes at this end.

Figure 2:
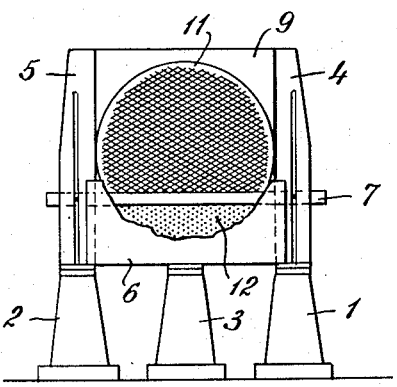
Figure 3:
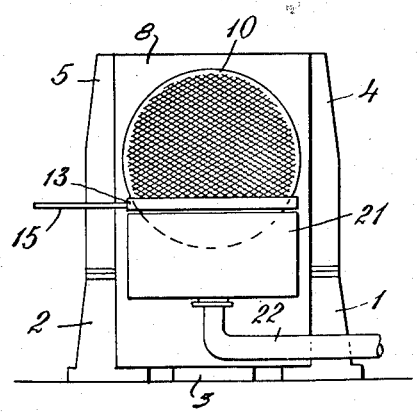
Figure 7:
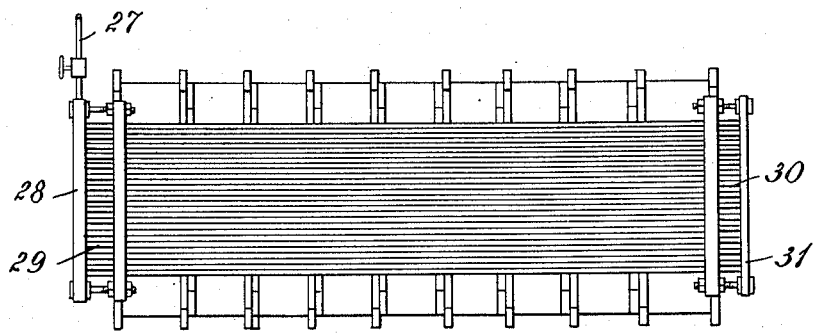
Figure 8:
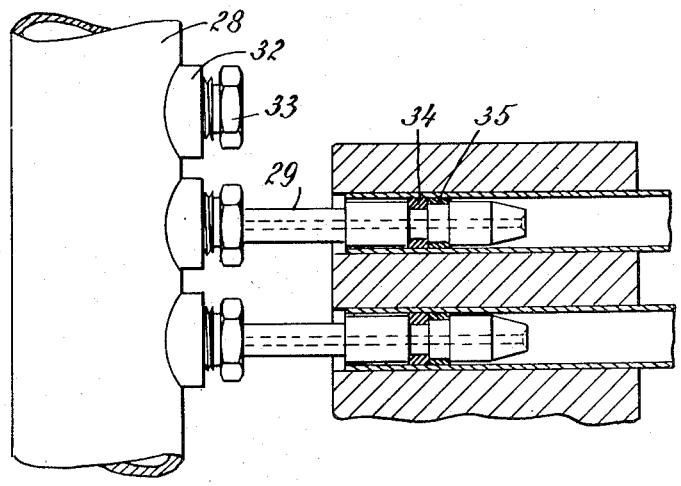

The invention is described in more detail below with the aid of the drawings. Fig. 1 shows a nest of tubes under construction in a side elevation, Fig. 2 the same in partial cross-section, and Fig. 3 the same in a front elevation. Fig. 4 shows part of a template, a template beam and a lateral supporting pillar to a larger scale. Fig. 5 shows to a still larger scale the application of the wedges used to ensure the right distance between tubes. Fig. 6 shows the insertion of the single welded bridges, Fig. 7 the nest of tubes from above with the arrangement for detecting leakages. Finally Fig. 8 shows on a larger scale a part of the arrangement employed for supplying pressure medium in the leakage test.

For constructing the nest of tubes a template scaffolding is employed which has three longitudinal beams 1, 2 and 3, by which the lateral pillars 4 and 5, the underlying supporting templates 6 and finally the overlying spacing template beams 7 are held in place. At the ends of the template scaffolding, supporting and positioning templates 8 and 9 are attached, and in these the tube end walls 10 and 11, respectively, are inserted. During the insertion of the welded bridges the tubes 12 and the tube end walls 10 and 11 are held in the position corresponding to the design of the nest by this template scaffolding. A cooling medium is meanwhile supplied through a distributing pipe 13 to some of the tubes which are heated by welding, while other tubes, which are only slightly or not at all warmed by the welding are heated by a heating medium supplied through the distributing casing 14.

It is appropriate to employ as a cooling medium air from the atmosphere which is introduced into the distributing pipe 13 through the pipe 15 by means of a supply device not shown in the drawing. From the distributing pipe single supply pipes 16 lead into the tubes of the top layer requiring to be cooled. In order to enable the supply of cooling medium to be interrupted temporarily, for instance during the insertion of the welded bridges between the tubes, closing members 17 are also provided in the supply pipes 16.

Air also serves as heating medium, being introduced into a heating device 19 with the aid of a fan 18 and conducted in a heated state through the pipe 20 into the distributing casing 14. It is expedient for the pipe 20 to have articulated joints not shown in detail in the drawings, in order to enable the position of the casing 14 to be continually adapted to the stage which the construction of the tube nest has reached. After the heating medium has flowed through the lower layers of the nest of tubes 12, it is collected by the casing 21 and returned to the fan 18 through the pipe 22, which is also equipped with articulated joints.

The design of the lateral pillars 4 and 5, the templates 6 and the template beams 7 is shown in the detail Fig. 4. The templates 6 have the form of a part of the circumference of the tube nest under construction. The outermost tubes of the nest are introduced into the indentations of this template. The template beam 7 also has indentations corresponding to the distance between the tubes of one tube layer.

With the aid of bolts inserted in the apertures 23 in the pillars 4 and in apertures of the template beam 7 the latter can always be kept the position which corresponds to the layer of tubes inserted at the top. In order to secure the right distance between the tubes 12b already welded (Fig. 5) and the tubes 12a not yet provided with welded bridges, wedges 24 are driven between these tubes and press the tubes 12a tight into the indentations 25 of the template beam 7.

For making the welded bridges the tube layer 12a not yet welded is cooled with the aid of the cooling medium. The layer of tubes 12b contains stagnating air which neither absorbs nor gives off heat. The lower layers 12c, however, have heating medium flowing through them. If necessary an insulating material, for instance asbestos sheeting, asbestos or glass wool, may also be introduced between the tube layers 12a and 12b or 12b and 12c. The insertion of the welded bridges begins in the centre of the tube layer 12a and at first only the welded bridges 26a (Fig. 6) in the middle are made. When these bridges have been completed the welded bridges 26b are made at the same time on the same and the neighbouring tube in staggered fashion. When these have been completed, the welded bridges 26c are simultaneously made. Then follow in a further simultaneous working process the weld points 26d, etc., in staggered fashion until the bridges are welded in to the outer circumference at that side of the nest of tubes. Obviously, during the insertion of the welded bridges in the direction running from the middle to the one side, the welded bridges from the middle to the other side are made at the same time and in the same staggered fashion. In the staggered production of the welded bridges described only two bridges are made at the same time on each tube.

The welded bridges can be produced by autogenous welding. In the process the welder preferably moves with the burner towards the flame so that the part of the tubes to which metal is applied is already preheated by the front end of the flame, while at the same time the danger of the newly applied material flowing away behind the flame is considerably diminished. During the insertion of the welded bridges the supply of cooling air is interrupted to those tubes of the layer being welded-in onto which the bridges are being made. Thus, according to the staggered application of the welded bridges, the cooling air supplied will be interrupted in a small number of adjacent tubes of the layer being welded-in. When all the welded bridges have been applied to a tube the cooling air supply is again opened. When all the welded bridges have been applied to a whole layer of tubes, the tubes of this layer are affixed to the tube end wall by being expanded at both ends. The expansion can be done for instance with the aid of known tube beaders or tube expanders. It is also possible, however, for a medium at high pressure to be introduced into the interior of the tube and for the tubes to be expanded by this and thus firmly fixed in the openings of the tube end walls.

When the welded bridges have been applied to all the tubes of two layers 12a, 12b, the tubes of these layers are tested for leakages. For this purpose a pressure medium is supplied by a pressure pump through the pipe 27 (Fig. 7) to the distributing pipe 28, this medium being conducted to the tubes of one tube layer through the supply pipes 29. On the other side the ends of the tubes are sealed with the aid of plugs 30 and a bridge piece 31, so that the tubes under pressure can be tested for leakages. The distributing pipe 28 (Fig. 8) has single connections 32 whose distance from each other corresponds to the distance between the tubes of one layer and in which either a blank pin 33 or a supply pipe 29 can be inserted as required. The supply pipe 29 has a sealing means 34 which is pressed against the tube with the aid of the ring 35 by the pressure of the pressure fluid itself. The closing plugs are similarly designed with the sole difference that they are not hollow, so that the tube to be tested is sealed from the outside.

The same process might be employed if the bridges were made not by autogenous welding, but by some other welding method, for instance by electric welding. The welded bridges may be made of the same metal as the tubes, or of a similar metal. Metals of other types, however, may also be employed in so far as they can be alloyed with the metal of the tubes at the point of connection. For this purpose additional substances may be employed which ensure good fluid fusion. The bridges may furthermore be formed by solid pieces of metal laid between the tubes and welded to them.

I claim:

1. The method of constructing a nest of parallel tubes spaced from one another by welded bridges and attached at their ends to tube end walls which comprises placing the tube end walls in their mutual, final, assembled relation in a template scaffolding, successively introducing single layers of tubes into said end walls, holding the tubes of the last-introduced layer of tubes onto which bridges are to be welded in their mutual, final, assembled relation by said template scaffolding, welding in the supporting bridges between the tubes of said last-introduced layer of tubes and the last previously introduced layer of tubes before the next successive layer of tubes is introduced, and simultaneously with the welding-in of each layer of tubes maintaining tubes of that layer on which the welding-in of the bridges between them and the last previously introduced layer of tubes has been completed in heat exchange with a cooling medium to absorb heat developed in those tubes as a result of the welding operation, and heating the last previously-inserted layer of tubes on which the welding-in of all the bridges has been completed by contact with a heating medium.

2. The method of constructing a nest of parallel tubes as set forth in claim 1 in which the spacing by the template scaffolding of the tubes between which bridges are being made is supplemented by wedges.

3. The method of constructing a nest of parallel tubes spaced from one another by welded bridges and attached at their ends to tube end walls which comprises holding the tube end walls in their mutual, final, assembled spaced relation, successively introducing single layers of tubes into said end walls, holding the tubes of the last-introduced layer of tubes onto which the bridges are to be welded in their mutual, final, assembled spaced relation, welding in the supporting bridges between the tubes of said last-introduced layer of tubes and the last previously introduced layer of tubes before the next successive layer of tubes is introduced, and simultaneously with the welding-in of each layer of tubes maintaining tubes of that layer on which the welding-in of the bridges between them and the last previously introduced layer of tubes has been completed in heat exchange with a cooling medium to absorb heat developed in those tubes as a result of the welding operation, and heating the last previously inserted layer of tubes on which the welding-in of all of the bridges has been completed by contact with a heating medium.

4. The method of constructing a nest of parallel tubes as set forth in claim 3 in which tubes of the layer being welded-in but on which the welding-in of the bridges has not yet begun also are cooling simultaneously with the welding-in of other tubes of that layer.

5. The method of constructing a nest of parallel tubes as set forth in claim 3 in which the heating medium is passed through the tubes to be heated.

6. The method of constructing a nest of parallel tubes as set forth in claim 3 in which the cooling medium is passed through the tubes to be cooled.

7. The method of constructing a nest of parallel tubes as set forth in claim 3 in which the tubes of the layer of tubes last previously introduced prior to the layer of tubes being welded-in enclose a stagnant medium.

8. The method of constructing a nest of parallel tubes as set forth in claim 3 in which at least three bridges are to be welded to the tubes of the layer of tubes being welded-in, and in which the bridges are welded-in in such a staggered fashion that only a part of the total number of bridges to be welded to any tube are welded-in at a time, while further bridges are being welded to neighboring tubes.

9. The method of constructing a nest of parallel tubes as set forth in claim 3 in which the tubes of the successive layers of tubes are fixed in the tube end walls after all the bridges have been secured to them.

10. The method of constructing a nest of parallel tubes as set forth in claim 3 in which insulating material is inserted between the tubes being cooled and the tubes being heated.

WALTER HUBER.

REFERENCES CITED

The following references are of record in the file of this patent:

UNITED STATES PATENTS

| Number | Name | Date |
| --- | --- | --- |
| 1,745,485 | Harter | Feb. 4, 1930 |
| 1,751,865 | Lewis et al. | Mar. 25, 1930 |
| 1,931,679 | Price | Oct. 24, 1933 |
| 2,107,435 | Birmingham | Feb. 8, 1938 |
| 2,186,641 | Jones | Jan. 9, 1940 |
| 2,267,619 | Strom | Dec. 23, 1941 |
| 2,303,473 | Jones | Dec. 1, 1942 |
| 2,332,368 | Burtenshaw | Oct. 19, 1943 |